Patented Dec. 10, 1946

2,412,465

UNITED STATES PATENT OFFICE 2,412,465

SYNTHESIS OF ETHERS OF VITAMIN A

Nicholas A. Milas, Belmont, Mass., assignor to Research Corporation, New York, N. Y., a corporation of New York No Drawing. Application January 17, 1945, Serial No. 573,313

12 Claims. (Cl. 260—611)

An object of the present invention is to provide a new method for the synthesis of ethers of vitamin A. This application is a continuation-in-part of my application Serial No. 409,314, filed September 2, 1941. In the said application I disclosed several methods for the synthesis of ethers of vitamin A based upon the concept of starting with the aldehyde compound

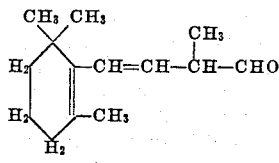

Compound I and the ketone compound

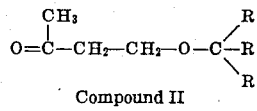

Compound II in which R stands for hydrogen or a hydrocarbon group. The group

may be any alkyl group such as methyl, ethyl, etc., including substituted alkyls such as triphenyl methyl in which the R's are phenyl groups. According to said application, the carbinol of one of said compounds is formed, united with the other compound via the Grignard or metallo derivative thereof, the product hydrogenated to convert the acetylene bond into an ethylene bond and the components dehydrated either before or after their combination.

The present application is concerned with the method in which the carbinol of Compound II is dehydrated before being combined with Compound I.

The principal steps involved in this process, starting with Compounds I and II, are as follows:

Compound II is converted into the corresponding acetylene carbinol which is dehydrated and the dehydrated product converted to the corresponding Grignard or metallo derivative (metal of the first group of the periodic system), the latter is then reacted with Compound I to form Compound VI which is converted to the vitamin A ether by two routes: (1) it is partially and selectively hydrogenated (acetylene to olefin) and the carbinol formed dehydrated or dehydrohalogenated to the vitamin A ether; (2) it is directly dehydrated to the polyen-yne (Compound VII) which is partially and selectively hydrogenated to the vitamin A ether.

The following equations illustrate the process:

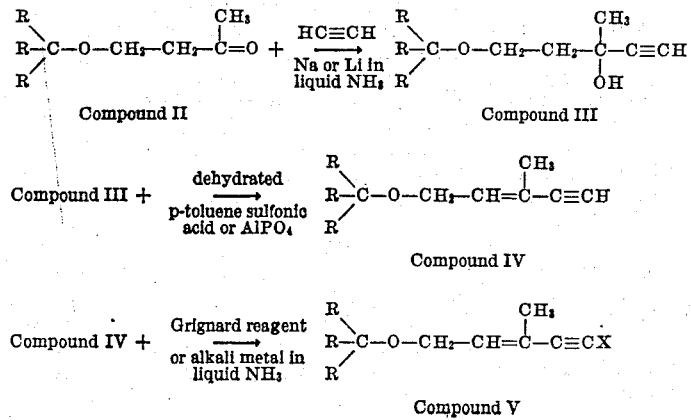

in which X stands for the Grignard group or a metal of the first group.

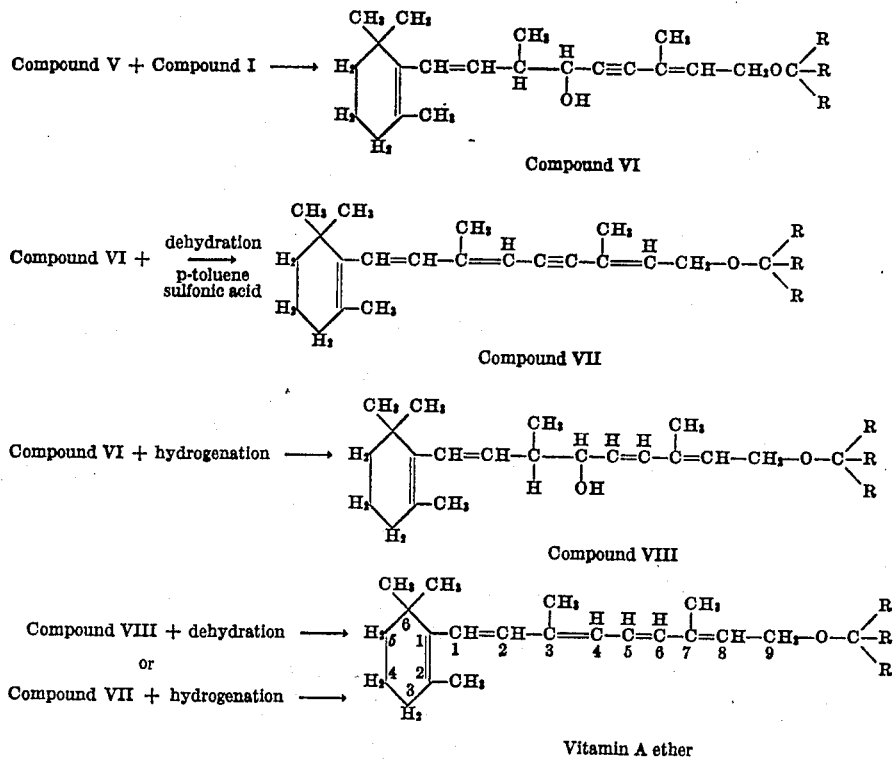

In the following specific examples of procedures for carrying out the reactions outlined above, the preparation of the ethyl ether of vitamin A will be used as illustrative and the compounds will be referred to by the numbers used in the above equations with the additional designation "ethyl."

*Preparation of 3-methyl 5-ethoxy penta-1-yn-3-ol (Compound III—ethyl) from β-ethoxyethyl methyl ketone (Compound II—ethyl).*—One liter of liquid ammonia was saturated with dry acetylene and, while stirring and passing acetylene through the liquid, 3.9 g. of lithium (sodium has also been used with less satisfactory results) was added in the course of one-half hour keeping the temperature of the mixture below −40° C. When all of the lithium had been converted to lithium acetylide, the mixture was cooled to −70° and to it added slowly with stirring in the course of one hour 58 g. of β-ethoxy-ethyl methyl ketone. Stirring was continued at the above temperature for 7-8 hours longer while a gentle stream of acetylene was allowed to pass through the mixture. The ammonia was then allowed to evaporate and 250 cc. of ether added to the residue and the mixture cooled to 0° and hydrolyzed with a solution of ammonium sulfate or chloride. The non-aqueous layer was then removed and the aqueous layer extracted twice with 250 cc. of ether and the ether extracts combined, dried and fractionated under reduced pressure using a six-inch Vigreux column. The fraction (28 g.) boiling at 50°–51° (4 mm.) was collected and analyzed. $n_D^{25}$, 1.4370; $d_4^{26}$, 0.922.

Anal. calcd. for $C_8H_{14}O_2$: C, 67.60; H, 9.86; unsaturation, 2F; active hydrogen (Zerewitinoff), 2. Found: C, 67.59, 67.83; H, 9.44, 9.55; unsaturation, 2.1F. (Pd); active hydrogen (Zer.), 1.9, 2.06.

This acetylene carbinol gives a heavy precipitate with ammoniacal alcoholic silver nitrate solution.

*Dehydration of 3-methyl 5-ethoxy penta-1-yn-3-ol (Compound III—ethyl) to 3-methyl 5-ethoxy penta-3-en-yne-1 (Compound IV — ethyl).*— Twenty-six grams of 3-methyl 5-ethoxy penta-1-yn-3-ol was passed upwards under a reduced nitrogen pressure (35 mm.) through a tube containing a mixture of aluminum phosphate and pumice and maintained at temperatures between 290–300° C. The crude dehydrated mixture was dried and fractionated under reduced pressure and the fraction boiling at 53°–54° (18 mm.) collected and analyzed. It was found to have an active hydrogen (Zer.) of 1.01, 0.92 and an unsaturation of 3.1, 3.09F agreeing very well with the theoretical values of 1.0 and 3.0 respectively; $n_D^{25}$, 1.4470.

3-methyl 5-ethoxy penta-1-yn-3-ol can also be dehydrated with anhydrous p-toluene sulfonic acid (usually about one-tenth by weight of the amount of the acetylene carbinol used) in solution with benzene, toluene or xylene. A portion of the solvent is distilled under a slightly reduced nitrogen pressure carrying with it the water formed by the dehydration of the carbinol. Finally, the mixture was extracted with dilute alkali to remove the p-toluene sulfonic acid, dried and fractionated to recover Compound IV—ethyl.

*Conversion of 3-methyl 5-ethoxy penta-3-en-yne-1 (Compound IV—ethyl) into its Grignard derivative thereof (Compound V—ethyl).*—A Grignard reagent was prepared in the usual manner from 6.3 g. of ethyl bromide and 1.4 g. of magnesium. The mixture was then cooled to 0° in an atmosphere of nitrogen and to it was added dropwise with stirring 6.5 g. of 3-methyl 5-ethoxy penta-3-en-yne-1, and stirring was continued overnight at room temperature. A white precipitate which was formed in the cold goes slowly into solution at room temperature. Finally, to insure complete reaction, the mixture was refluxed for one hour before proceeding with the next step.

*Reaction of Compound V—ethyl with Compound I to form Compound VI—ethyl.*—The Grignard (Compound V—ethyl) described in the previous section was cooled to 0° and to it added dropwise with stirring in the course of one-half hour 10.8 g. of Compound I in 50 cc. of anhydrous ether. Stirring of the mixture in nitrogen was continued overnight then it was refluxed gently for one hour. Finally, the mixture was cooled to 0° and hydrolyzed with 100 cc. of water containing 5 g. of ammonium chloride. The ether layer was separated, dried and the ether removed. The residue was taken up in petroleum ether in order to remove inorganic and other insoluble materials. The petroleum ether was removed and the residue subjected for one hour at 100° C. to a high vacuum ($10^{-4}$—$10^{-5}$ mm.) to remove volatile materials such as unreacted portions of Compounds I and IV. The final product (10.5 g.) is a pale yellow highly viscous liquid and attempts to crystallize it were unsuccessful.

The ultra-violet spectrum of this product shows an absorption band with a maximum at 2330 A° having an

value of 615.

Anal. calcd. for $C_{22}H_{34}O_2$: C, 80.00; H, 10.30; unsaturation, 5F; active hydrogen (Zer.), 1.0. Found: C, 79.98, 79.04, 79.65; H, 11.23, 10.54, 11.20; unsaturation, 5.31 (Pt), 5.30 (Pd) F; active hydrogen (Zer.), 1.15.

The slightly higher value for unsaturation is probably due to slow hydrogenolysis of the hydroxyl group.

*Dehydration of Compound VI—ethyl to Compound VII—ethyl.*—To 250 cc. of pure toluene was added 0.3 g. of p-toluene sulfonic acid monohydrate. To dehydrate the p-toluene sulfonic acid, 100 cc. of toluene was distilled carrying the water with it. The solution was then cooled in nitrogen and to it was added 9.5 g. of Compound VI in 250 cc. of toluene and about 150 cc. of toluene was distilled in nitrogen. The mixture was then cooled to room temperature and shaken with 150 cc. of methanol containing 3 g. of potassium hydroxide. Water was then added to separate the alcohol from the toluene layer, the latter removed, dried and the toluene removed under reduced pressure. The residue was further purified first from olefin-free petroleum ether then dissolved in 90% methanol and extracted with petroleum ether and finally fractionated successively in 10° interval from 0° to —78° using anhydrous methanol as solvent. Thus purified, Compound VII—ethyl is almost insoluble in methanol at —40° to —70° C. The final product is a pale yellow highly viscous liquid which exhibits a broad absorption band with a sharp maximum at 3170A° having an

value of approximately 1200. This product was then distilled under highly reduced pressure ($10^{-4}$-$10^{-5}$ mm.) and the product boiling at 95-98° collected and analyzed. This has an

(3150) value of 1231.

Anal. calcd. for $C_{22}H_{32}O$: C, 84.61; H, 10.23; unsaturation, 6.0 F; active hydrogen (Zer.), 0.0. Found: C, 84.58, 85.22; H, 10.90, 11.00; unsaturation, 6.39 (Pt), 6.28 (Pd) F; active hydrogen (Zer.), 0.05 (within exptl. error).

*Conversion of Compound VII—ethyl into vitamin A ethyl ether.*—It is well known that in the partial hydrogenation of an acetylene bond attached to two different groups, as in the case of Compound VII, to give the corresponding olefin, the latter may be present in two different isomers, cis and trans. The proportion of these two isomers depends upon the method used to add the two hydrogen atoms to the acetylene bond. For instance, if selective catalytic hydrogenation is employed the predominant isomer present is cis, whereas if a chemical method (e. g. a metal or its amalgam of the first and second groups of the periodic system+alcohol, liquid ammonia or any substance which gives "nascent" hydrogen on reacting with the metal, zinc aluminum or their amalgams or certain alloys of these metals are allowed to react with inorganic or organic bases or organic acids to give "nascent" hydrogen) is used the predominant isomer present is trans. Examples of each of these two methods are given in the following disclosures:

(1) *Catalytic method.*—To 50 cc. of absolute alcohol was added 0.3398 g. of 10% palladium hydroxide on calcium carbonate and the palladium hydroxide reduced with hydrogen gas into palladium black. To this mixture was then added 1.6505 g. of compound VII in 25 cc. of absolute alcohol and hydrogen gas was introduced until 127 cc. (N. T. P.) was absorbed. The reaction was stopped and the vitamin A ether recovered and examined spectroscopically. The crude product was found to exhibit a broad absorption band in the ultra-violet with a maximum at 3140–3150° A° having an

value of about 1000. When tested on vitamin A deficient rats this product was found to be biologically very active.

(2) *Chemical method.*—Compound VII (2.031 g.) dissolved in 26 cc. of anhydrous methanol was added to 100 cc. of 90% ethanol containing 6 g. of solid potassium hydroxide and to this mixture was added 0.52 g. of zinc dust. Gentle stirring was provided by nitrogen bubbling through the mixture for seventeen hours. The reaction mixture was then diluted with water and extracted with olefin-free petroleum ether, the latter dried, filtered and the petroleum ether removed. The residue was then examined spectroscopically. It was found to exhibit an absorption band in the ultra-violet with a maximum at 3200 A°. The band was not only shifted toward the visible region of the spectrum but it was much narrower than that shown by either the original dehydro-ether or the product (cis) made by the first method. That it was partially and selectively hydrogenated, was also shown by a complete catalytic hydrogenation which gave a value of 4.84 (Pt.) F as compared to 6.2 F found for the original product.

This partial reduction was also accomplished by using an organic acid (acetic acid) in alcoholic solution with zinc dust instead of alkali.

*Conversion of Compound VI—ethyl into 5-cis-Compound VIII—ethyl (catalytic method).*—To 100 cc. of absolute alcohol was added about 0.6 g. of 10% paladium hydroxide on calcium carbonate and the palladium hydroxide reduced with hydrogen gas into paladium black. To this mixture was then added 3.3 g. of Compound VI—ethyl in 50 cc. of absolute alcohol and hydrogen gas introduced until about 225 cc. (N. T. P.) was absorbed. The reaction was stopped and the product (Compound VIII—ethyl) recovered as a pale, yellow, highly viscous liquid.

5-cis-Compound VIII—ethyl was dehydrated to the 5-cis vitamin A ethyl ether in boiling toluene with small amounts (2% of the weight of Compound VIII—ethyl) of p-toluene sulfonic acid.

In the conversion of 5-cis Compound VIII—ethyl into the 5-cis vitamin A ethyl ether, one may use the following procedure: Dissolve 0.2 of a mole of 5-cis-Compound VIII—ethyl in about 150 cc. of anhydrous toluene and add to the mixture 30 g. of anhydrous pyridine. Cool the mixture to between 0° and −5° C. and add with rapid stirring 0.42 of a mole of phosphorus tribromide. Allow the mixture to warm slowly to room temperature and increase the temperature to about 50° C. and keep it there for one to two hours. The mixture will become brown. Cool and add to it 300 cc. of 95% alcohol containing 0.45 of a mole of solid potassium hydroxide. The mixture will heat up but do not allow the temperature to exceed the boiling point of the alcohol. Keep it at this temperature with nitrogen passing through the solution for two to three hours, then remove most of the alcohol under reduced pressure. Cool and dilute the mixture with about four volumes of cold deoxygenated water and separate the resulting layers. Extract the aqueous layer once or twice with petroleum ether and combine non-aqueous extracts. Extract the non-aqueous solutions with 5% aqueous tartaric acid solution. Finally, dry the non-aqueous solutions, remove the solvents under reduced pressure and subject the residue to a high vacuum at not higher than 60°–80° C. (bath temperature) in order to remove volatile constituents.

*Conversion of Compound VI—ethyl into 5-trans-Compound VIII—ethyl (chemical method).*—Compound VI—ethyl (3.3 g.) dissolved in about 25 cc. of anhydrous methanol was added to 100 cc. of 90% ethanol containing 5 g. of solid potassium hydroxide and to this mixture was added 0.8 g. of zinc dust. Gentle stirring was provided by nitrogen bubbling through the mixture for about 20 hours. The reaction mixture was then diluted with water and extracted with olefin-free petroleum ether, the latter dried and the petroleum ether removed. The residue was 5-trans Compound VIII—ethyl.

*Conversion of 5-trans Compound VIII—ethyl into 5 trans vitamin A ethyl ether.*—This conversion was accomplished either by dehydration using p-toluene sulfonic acid in boiling toluene, or by the dehydrobromination method described previously.

Compound II—ethyl used in the preparation of the ethyl ether of vitamin A may be prepared as described in my application Serial No. 409,314.

Compound I may be prepared as described in my application Serial No. 353,775, filed August 22, 1940.

For the preparation of the trityl ether of vitamin A one starts with compound II phenyl, that is, Compound II in which the three R's stand for phenyl groups, which may be prepared as described in my application Serial No. 409,314 instead of Compound II—ethyl as described above.

I claim:

1. As a new product a compound of the formula

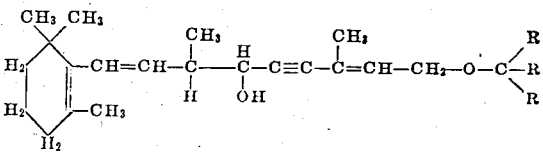

in which R stands for a member of the group consisting of hydrogen and hydrocarbon groups.

2. Product as defined in claim 1 in which each R stands for a phenyl group.

3. Product as defined in claim 1 in which two R's stand for hydrogen and one R stands for a methyl group.

4. Process for the synthesis of vitamin A ethers which comprises reacting a compound of the formula

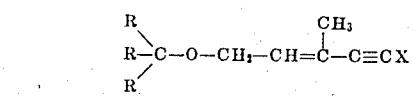

in which R stands for a member of the group consisting of hydrogen and hydrocarbon groups and X stands for a member of the group consisting of the Grignard group and metals of the first group of the periodic system with a compound of the formula

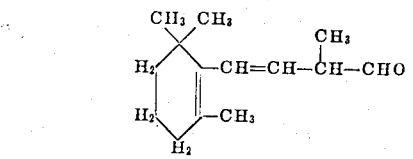

5. Process as defined in claim 4 in which X stands for the Grignard group.

6. Process as defined in claim 4 in which X stands for a metal of the first group of the periodic system.

7. Process as defined in claim 4 in which the product is dehydrated.

8. Process as defined in claim 4 in which the product is dehydrated and the resulting compound hydrogenated to convert the acetylene into an ethylene bond, the hydrogenation being effected catalytically.

9. Process as defined in claim 4 in which the product is dehydrated and the resulting compound hydrogenated to convert the acetylene into an ethylene bond, the hydrogenation being effected chemically.

10. Process as defined in claim 4 in which the product is hydrogenated catalytically.

11. Process as defined in claim 4 in which the product is partially and selectively hydrogenated chemically.

12. As a new product a compound of the formula

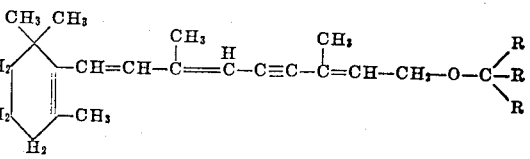

in which R stands for a member of the group consisting of hydrogen and hydrocarbon groups.

NICHOLAS A. MILAS.